INVENTOR.
ROGER T. BECKER
BY
Woodhams, Blanchard & Flynn
ATTORNEYS

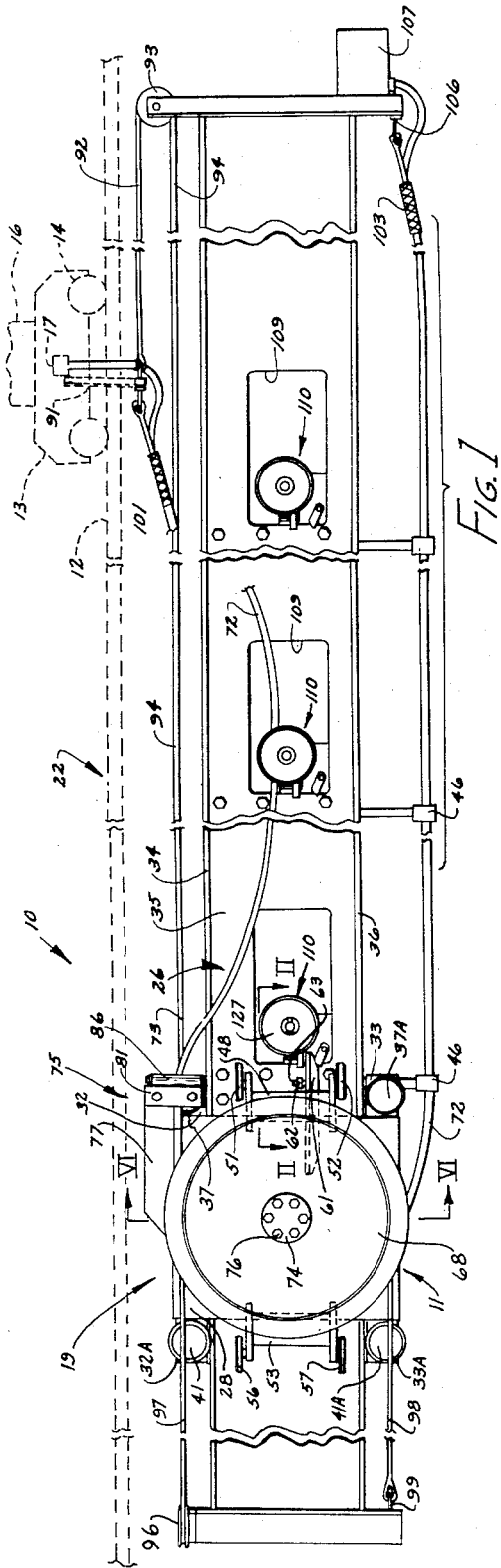

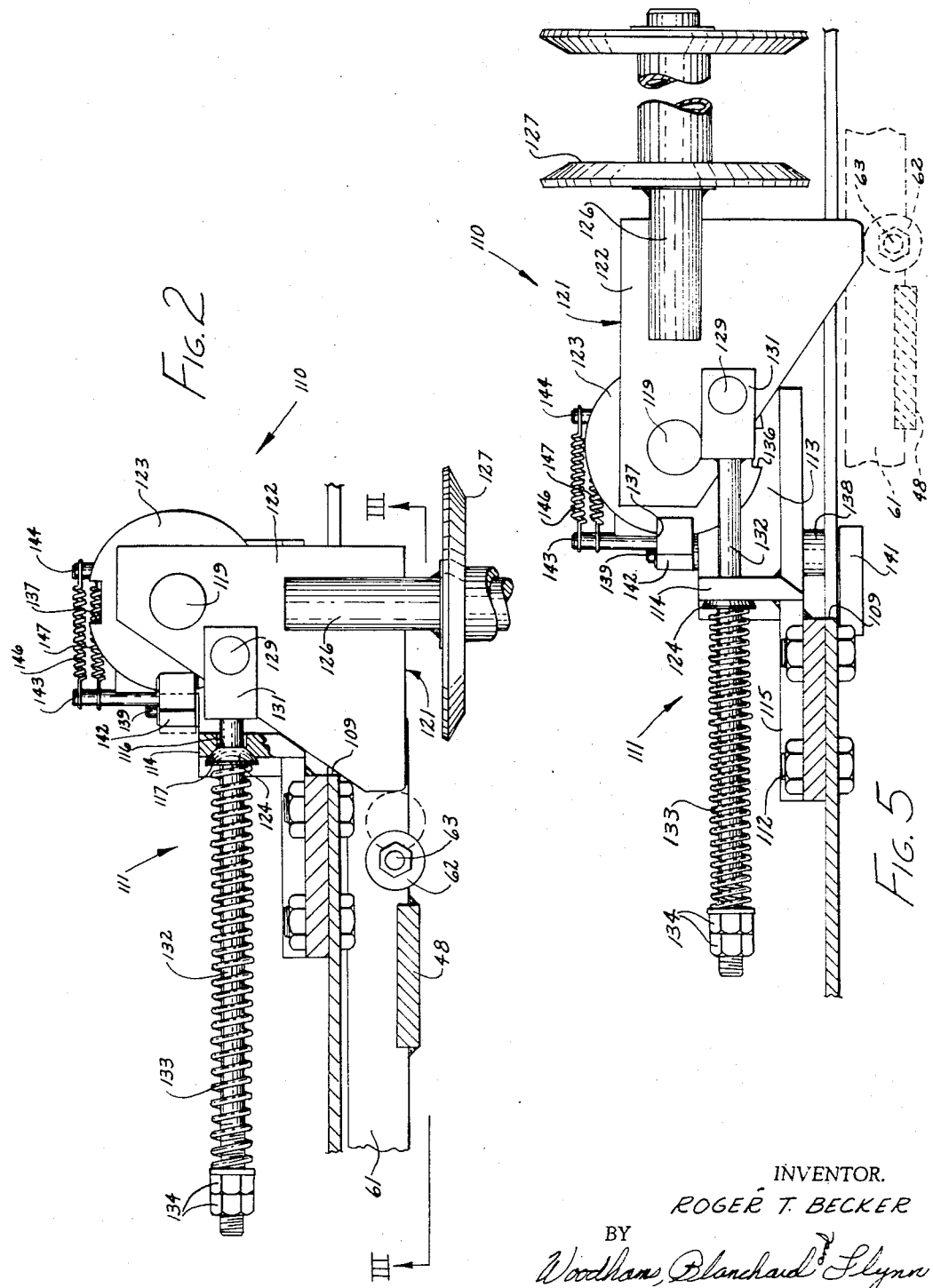

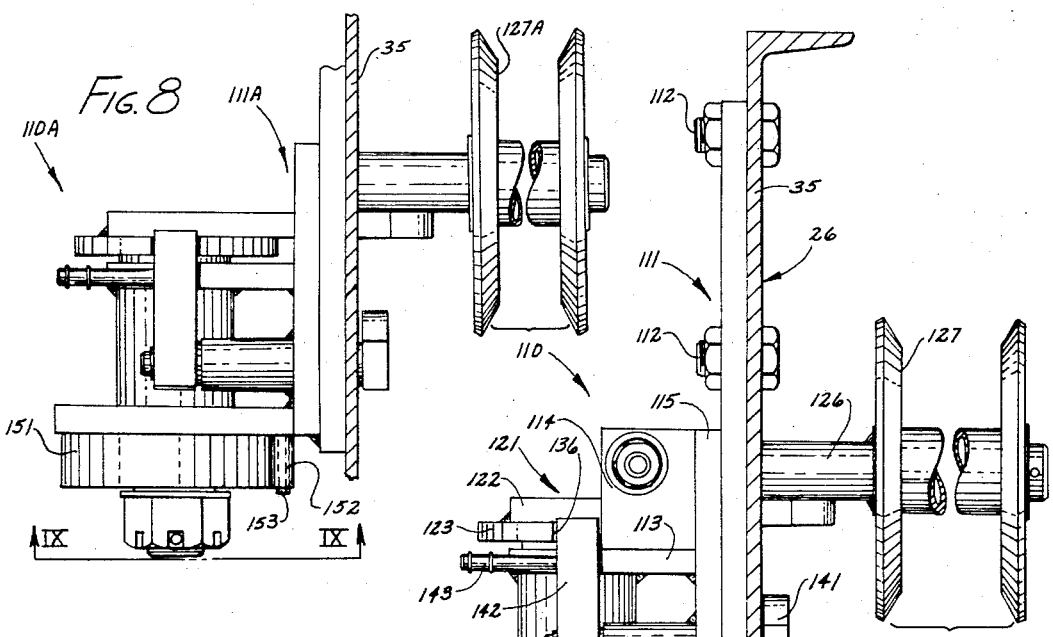
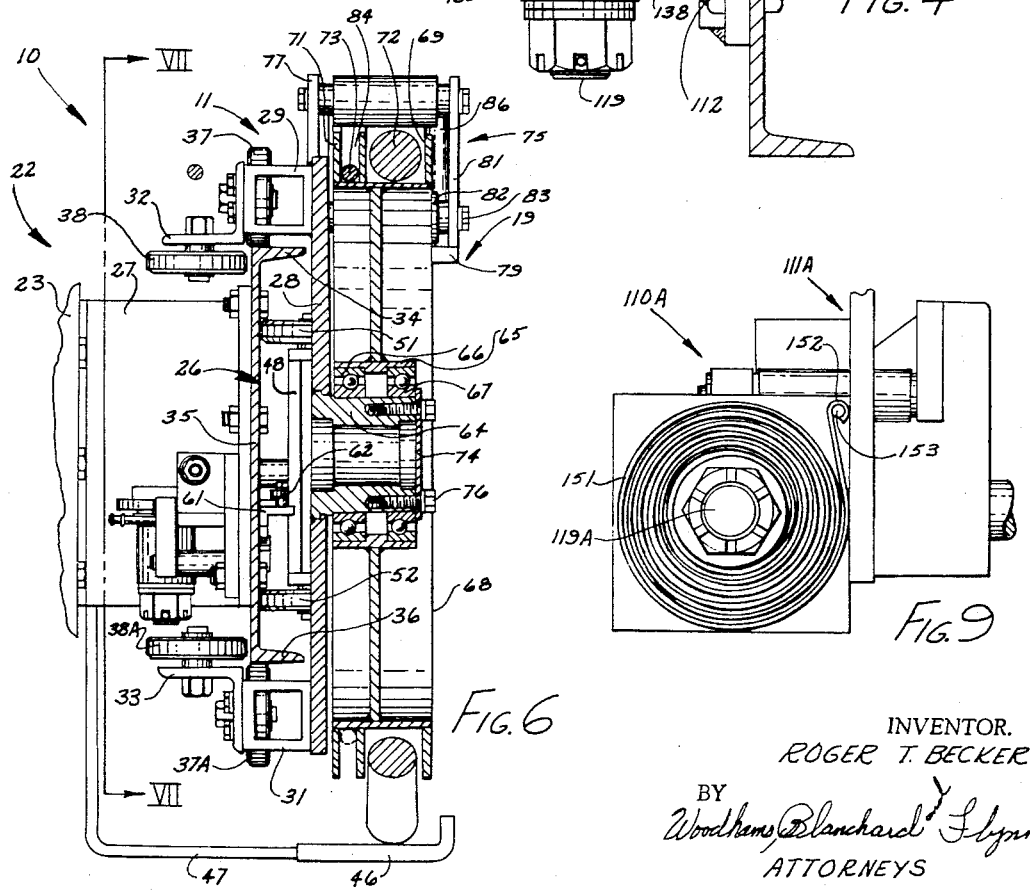

United States Patent Office 3,423,545
Patented Jan. 21, 1969

3,423,545
POWER CARRIAGE WITH RETRACTABLE PULLEY
Roger T. Becker, Kalamazoo, Mich., assignor to Aero-Motive Manufacturing Company, Kalamazoo, Mich., a corporation of Michigan
Filed Aug. 23, 1967, Ser. No. 662,612
U.S. Cl. 191—12            14 Claims
Int. Cl. H02g 11/02; B66c 17/00

ABSTRACT OF THE DISCLOSURE

An apparatus having a cable support movable along a track extending along a path traversed by a movable device to which one end of a flexible cable is connected, the other end of said cable normally being fixed with respect to the track. Tension means is connected to the cable support for urging same along the track means so that a tension is constantly applied to the cable. One or more pulleys are mounted adjacent the track means so that they will support the part of the cable extending between the cable support and the movable device. Each pulley is mounted so that its normal position is in the path of the cable support and so that it is automatically moved out of such path by the cable support as same moves along the track past the pulley.

Field of the invention

This invention relates in general to a power carriage having support means for engaging and maintaining a tension on an elongated flexible element connected between fixed and movable points and, more particularly, to retractable pulley means for supporting the portion of said flexible element between the movable means and the support means.

Description of the prior art

Many devices have been developed for the purpose of supporting flexible elements, such as electrical conductors, fluid conduits and the like, between a fixed point and a movable device so that such elements are held away from interference with the operation of and/or movement of the machine or other movable device to which they are attached and thereby are not damaged or fouled. One type of apparatus designed for this purpose is disclosed in the copending patent application Ser. No. 511,728, filed Dec. 6, 1965, and assigned to the assignee of this application. However, in the course of adapting the structure in said prior application for various uses, it was found that more intermediate support was often desirable for the part of the flexible element or elements extending between the moving device and the tension applying carriage due to the excessive weight achieved by these elements particularly where long spans were involved and large carrying capacity was required. Various types of hangers and supports were tried but all failed primarily because they interfered with the movement of the element tensioning carriage along the track, or because they permitted the cable to drape excessive distances and drag along the supporting structures, with resultant excessive wear.

In order to reduce the above-mentioned excessive wear or drape, the tension applied by the carriage was increased as much as possible consistent with the strength of the elements being carried. However, this solution to the problem created several additional problems. For example, it necessitated a stronger carriage, a stronger track structure and, in some instances, a more powerful power source for moving the movable device to which the elements were attached, which increased the cost of the overall apparatus. Moreover, in spite of these adjustments, the initial problem was not completely eliminated. That is, the draping and resultant dragging of the moving portion of the flexible element still existed, particularly in long spans.

Accordingly, a primary object of this invention has been the provision of a power carriage for supporting and applying tension to an elongated, flexible element and having retractable means for supporting that part of the flexible element near the movable device to which the element is connected without interfering with the parts of the carriage which maintain the tension on the flexible element as it moves with the movable device.

A further object of this invention has been the provision of a power carriage, as aforesaid, wherein the retractable means includes one or more pulleys, each of which is mounted adjacent a track for movement between a first position for supporting the element and a second position out of the path of movement of the element tensioning device of the carriage.

A further object of this invention has been the provision of a power carriage, as aforesaid, which effectively performs the element carrying function while avoiding the excessive drape and resultant wear of the elements which has been found heretofore in structures of this general character or for this purpose.

Other objects and purposes of this invention will become apparent to persons familiar with this type of equipment upon reading the following descriptive material and examining the accompanying drawings, in which:

FIGURE 1 is a broken side elevational view of an apparatus including a cable-driven power carriage and cable support mechanism embodying the invention.

FIGURE 2 is a sectional view taken along the line II—II in FIGURE 1.

FIGURE 3 is a sectional view taken along the line III—III of FIGURE 2.

FIGURE 4 is a sectional view substantially as taken along the line IV—IV in FIGURE 3.

FIGURE 5 is a sectional view similar to FIGURE 2 with parts thereof in different operational positions.

FIGURE 6 is a sectional view taken along the line VI—VI in FIGURE 1.

FIGURE 8 is a side elevational view of a modified cable support mechanism embodying the invention.

FIGURE 9 is a sectional view taken along the line IX—IX in FIGURE 8.

Figure 7:
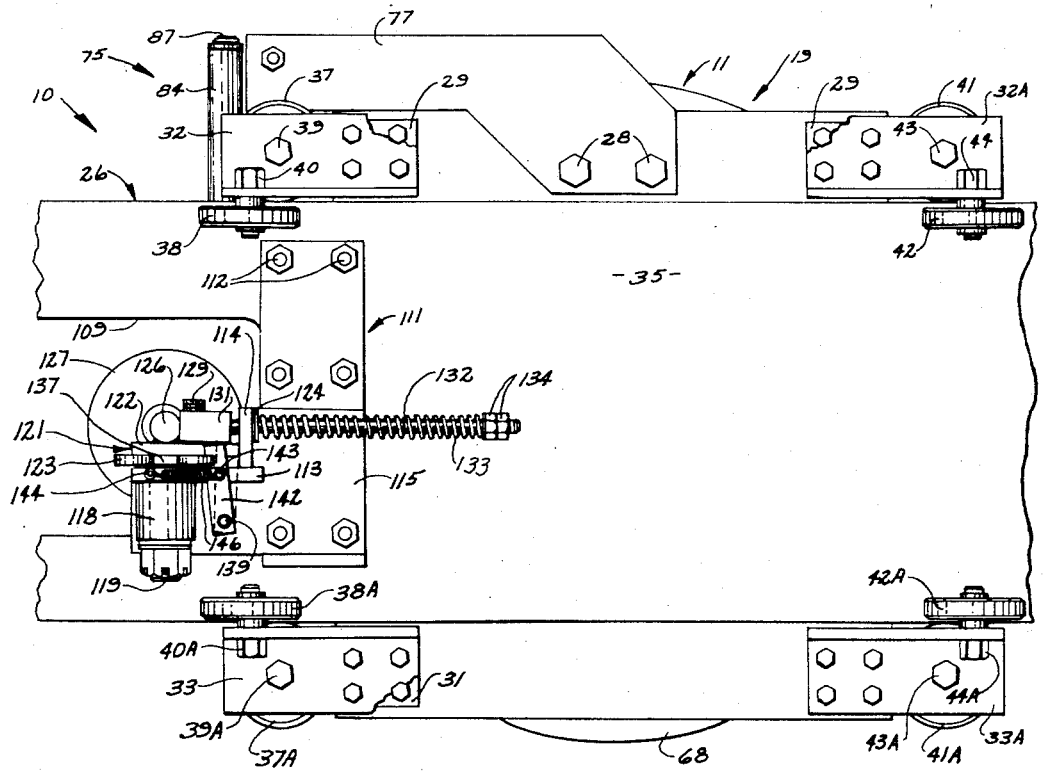
FIGURE 7 is a sectional view taken along the line VII—VII in FIGURE 6.

Certain terminology will be used in the following descriptive material for convenience in reference only and will not be limiting. The words "upwardly," "downwardly," "frontwardly" and "rearwardly" will designate directions in the drawings as appearing in FIGURE 1, frontwardly being rightwardly. The words "inwardly" and "outwardly" will refer to directions toward and away from, respectively, the geometric center of the device and designated parts thereof. Such terminology will include the words above specifically mentioned, derivatives thereof and words of similar import.

Summary of the invention

In general, the objects and purposes of the invention are met by providing a power carriage having retractable pulley means movably mounted upon track means for supporting that part of an elongated, flexible element extending between the tension applying device of the carriage and a movable device to which is secured one end of said elongated, flexible element. The other end of the elongated, flexible element is fixed with respect to the track means.

Detailed description

The apparatus 10, which has been selected to illustrate an environment for the invention, may be associated with or part of an overhead crane having a power carriage 11 supported in any convenient manner (not shown) such as illustrated in said copending application Ser. No. 511,728. The overhead crane includes a plurality of rails 12 upon which a power-using vehicle 13 is supported for movement lengthwise of the rails 12 by the rail-engaging wheels 14. A power driven element 16, such as a hoist motor, can be mounted on the vehicle 13 and electric power can be supplied thereto through the movable junction box 17 on the vehicle 13 for driving same and for driving the wheels 14.

The carriage 11 is comprised of a wheeled device 19 supported upon a track assembly 22, as illustrated in FIGURE 6, which is an elongated, channel-shaped rail 26 which extends generally parallel to and co-extensive with the rails 12 and is secured to the carriage frame 23 by a spacing block 27.

The wheeled device 19 comprises a frame member 28 which is, in this embodiment, a vertically oriented plate as illustrated in FIGURE 6 and has a pair of upper tubular members 29 and a pair of lower tubular members 31 longitudinally secured to the inner side of the plate 28. Upper and lower pairs of L-shaped brackets 32, 32A and 33, 33A, respectively, (FIGURE 7) are secured to the tubular members 29 and 31, respectively.

A pair of wheels 37 and 38 are rotatably secured to the bracket 32 by bolts 39 and 40. The wheel 37 rotates about a horizontal axis and is positioned to roll on the upper flange 34 of the rail 26. The wheel 38 is rotatably secured to the bracket 32 about a vertical axis and is positioned to roll on the outer surface of the web 35 of the rail 26.

Referring to the bracket 32A, the wheel 41 is secured by bolt 43 to rotate about a horizontal axis and is positioned to roll on the upper flange 34 of the rail 26. The wheels 37 and 41 serve as the main support for the wheeled device 19. The wheel 42 is secured by the securing bolt 44 to the bracket 32A to rotate about a vertical axis. The wheels 38 and 42 are positioned to bear against the outer surface (FIGURE 6) of the web 35 to prevent movement of the wheeled device 19 away from the rail 26.

The wheels 37A and 38A are rotatably secured to the bracket 33 about the axes of the securing bolts 39A and 40A, respectively. The wheels 41A and 42A are rotatably secured to the bracket 33A about axes of the securing bolts 43A and 44A. The wheels 37A and 41A (FIGURE 1) are positioned slightly below the lower flange 36 of the rail 26 and serve to prevent upward movement of the wheeled device 19. The wheels 38A and 42A serve in the same manner as wheels 39 and 42, namely, to prevent a sideward movement of the wheeled device 19.

A bracket 48 is secured to the front end (FIGURE 1) of the frame member 28 by any convenient means, and coaxial wheels 51 and 52 are rotatably supported upon the bracket 48 by any convenient means. Similarly, a bracket 53 is secured to the rear end of the frame member 28, and coaxial wheels 56 and 57 are rotatably supported upon the bracket 53 by any convenient means. The wheels 51, 52 and 56, 57 are positioned to roll on the inner surface (FIGURE 6) of the web 35 to prevent sideward movement of the wheeled device 19.

An actuating bar 61 is secured to the bracket 48 (FIGURE 2) by any convenient means such as welding. A roller 62 is mounted upon the front end (FIGURES 1, 2 and 3) of the actuating bar 61 and is rotatable about the vertical axis of the securing bolt 63.

The frame member 28 has an axle 64 (FIGURE 6) preferably positioned in the center thereof and projecting outwardly therefrom. Bearings 66 and 67 are supported on the axle 64 and rotatably support the hub 65 of a drum 68. The radially outer surface of the drum 68 is provided (in this embodiment) with two circumferential tracks 69 and 71 which guide cables 72 and 73, respectively. However, additional tracks may be provided to accommodate additional cables. A bearing retainer 74 is secured to the hub 64 by a plurality of bolts 76.

A cable guiding mechanism 75 (FIGURES 1 and 7) is positioned at the upper front end of the wheeled device 19 and comprises an extension 77 secured to the upper edge of the plate 28 by a plurality of bolts 78. A flange 79 projects rightwardly (FIGURE 6) therefrom and supports at its outer end a plate 81 which extends upwardly therefrom. A roller 82 is horizontally, rotatably supported by and between the extension 77 and the plate 81 upon a bolt 83 extending through said roller. A pair of spaced apart, parallel and vertically oriented rollers 84 and 86 are rotatably mounted upon the flange 79 by any convenient means such as bolts 87 (FIGURE 7). The rollers 82, 84 and 86 guide the cable 72.

A plurality of longitudinally spaced cable support hooks 46 (FIGURE 1) are secured to the track assembly 22 so that the horizontal legs 47 thereof are positioned below (FIGURE 6) and in radial alignment with the track 69 on the drum or rotary device 68.

The cable 73 (FIGURE 1) interconnects the vehicle 13, the wheeled device 19 and the track assembly 22. More particularly, one end of the cable 73 is secured to a member 91 which projects downwardly from the vehicle 13. The cable 73 has a reach 92 which extends frontwardly around a pulley 93 mounted on the upper front end of the track assembly 22. The reach 94 of the cable 73 extends rearwardly from the pulley 93 to a second pulley 96 mounted on the upper rear end of the track assembly 22. The reach 97 of the cable 73 extends frontwardly from the pulley 96 and is guided by the track 71 around the drum 68. The reach 98 of cable 73 extends rearwardly from the lower side of the drum 68 and is secured to an adjustable bolt 99 mounted upon the lower rear end of the track assembly 22. Thus, as the vehicle 13 moves rearwardly leftwardly in FIGURE 1, the wheeled device 19 will be moved rearwardly by the cable 73, but at only half the speed of the vehicle 13 in this embodiment. A tightening of the cable 73 by adjustment of the bolt 99 will increase the tension on the cable 72. Similarly, an opposite adjustment will reduce the tension.

One end of the cable 72 is electrically connected to the junction box 17 on the vehicle 13 and is supported on the member 91 by a coupling 101 wrapped around a portion of the cable 72 adjacent the one end thereof. The cable 72 extends rearwardly from the junction box 17, around the rotary device 68 in the track 69 and thence frontwardly from the lower side thereof. The other end of cable 72 is secured, by a coupling 103 wrapped around a portion of the cable, to an anchor 106, which is secured to the lower front end of the track assembly 22. The other end of the cable 72 is electrically connected to the junction box 107, which is secured to the lower front end of the track assembly 22. The junction box 107 may be connected to a source of electrical energy (not shown) in any conventional manner. For example, the apparatus 10 may be equipped with a trolley mechanism of the type disclosed in said copending application Ser. No. 511,798.

A plurality of spaced openings 109 (FIGURE 1) are provided in the web 35 of the rail 26, and a retractable pulley mechanism 110 (illustrated in FIGURES 1-5) extends through each of these openings.

A support frame 111 for the retractable pulley mechanism 110 (FIGURE 4) is secured to the rail 26 by a plurality of bolts 112 and includes a bracket 113 which projects leftwardly from the member 115. A flange 114 projects upwardly from the bracket 113 and has a horizontal opening 116 (FIGURE 2) therethrough. The wall defining opening 116 has a semispherical surface 117 at its rearward end.

A bearing assembly 118 is secured to the bracket 113 and rotatably supports a shaft 119 about a vertical axis.

A lever assembly 121 is secured to the upper end of the shaft 119 and is rotatable therewith. The lever assembly 121 comprises a pair of connected, parallel plates 122 and 123, said plate 123 being positioned below the plate 122.

The plate 122 is triangular in shape and projects through the opening 109 in the web 35 into the path of the roller 62 on the actuating bar 61. A stub shaft 126 is secured to the upper surface of the plate 122 and its axis is preferably perpendicular to the axis of the shaft 119 and capable of projecting through the opening 109 when the pulley mechanism 110 is in a position of supporting alignment with the cable 72. A pulley 127 is rotatably supported on the outer end of the stub shaft 126.

A spring support rod 132 (FIGURE 2) is pivotally secured to the plate 122 by a pivot pin 129 and a pivot block 131. The rod 132 projects rearwardly from the block 131 and slidably supports an annular member 124 having a truncated spherical surface adapted to engage the semi-spherical surface 117. A spring 133 is sleeved on the rod 132 and is positioned between the member 124 and a pair of lock nuts 134 secured to the rear end of the rod 132. The tension on the spring 133 can be regulated by varying the position of the nuts 134 on the rod 132.

The circular plate 123 has a pair of notches 136 and 137 circumferentially spaced (FIGURE 2) in this particular embodiment at approximately 90 degrees around the axis of the shaft 119.

A sleeve bearing 138 (FIGURE 4) is secured to the left face of the frame member 111 so that its axis is transverse of the axis of the shaft 119. A shaft 139 is rotatably supported by the sleeve 138 and projects from both ends thereof. A first lever arm 141 is secured to the right end of the shaft 139 (FIGURE 4) and extends rearwardly along the rail 26 (FIGURE 3) into the path of the lower edge of the actuating bar 61. A second lever arm 142 is secured to the left end of shaft 139 (FIGURE 4) by any convenient means and is positioned so that it can pivot into and out of the notches 136 and 137 in the plate 123.

A pin 143 projects sidewardly (FIGURE 5) from the lever arm 142, and a pin 144 projects sidewardly (FIGURE 5) from the bearing assembly 118, generally parallel to the pin 143. A pair of springs 146 and 147 extend between the pins 143 and 144 to bias the lever arm 142 into engagement with the edge of the plate 123.

*Alternate construction*

A modified retractable pulley mechanism 110A is illustrated in FIGURES 8 and 9. Parts of the modified mechanism 110A will be referred to by the same reference numerals designating corresponding parts of the mechanism 110 with the suffix A added thereto. The two mechanisms are the same, except for the type of spring assembly utilized to urge the pulley 127A into the position projecting through the opening 109 in the web 35.

The mechanism 110A employs a coil spring 151 which is secured at its inner end to the shaft 119A. The outer end of the coil spring 151 is secured to the frame member 111A by a hook 152 on the end of the spring which engages a pin 153.

Figure 10:
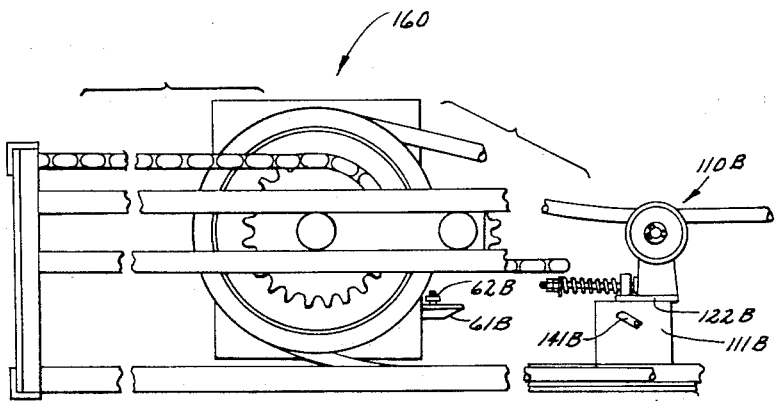
FIGURE 10 is a broken side elevational view of another type of power carriage utilizing a retractable cable support pulley.

FIGURE 10 illustrates the adaptation of the retractable pulley mechanism 110B to use with a self-propelled device 160 of the type disclosed in said copending application Ser. No. 511,728, filed Dec. 6, 1965. Specifically, the actuating bar 61B (FIGURE 10) on the device 160 engages the lever 141B, and the roller 62B engages the lever 122B to effect retraction and extension of the pulley mechanism 110B in a manner substantially as discussed herein with respect to the mechanism 110. The device 160 includes a torque developing unit, such as a coil spring, which is also disclosed in said copending application.

*Operation*

Although the operation of the apparatus embodying the invention has been indicated somewhat above, said operation will now be described in detail for a better understanding of the invention.

When the retractable pulley mechanism 110 is in the cable support position of FIGURES 1 and 4, the stub shaft 126 and pulley 127 project through the opening 109 in the web 35 of rail 26 so that supporting engagement can be made with the cable 72. Thus, an effective intermediate support is provided for the cable 72 without increasing the tension thereon. However, since the support position of the retractable pulley mechanism 110 is in the path of movement of the wheeled device 19, the retractable pulley mechanism must be rotated out of its supporting position about the axis of the shaft 119 into the position illustrated in FIGURE 5.

More specifically, frontward movement of the vehicle 13 acts through the cable 73 to move the cable 72, hence the wheeled device 19, frontwardly. Thus, the front bevel on the lower edge of the actuating bar 61 is moved into engagement with the lever 141 and depresses it into the broken line position shown in FIGURE 3. Accordingly, the lever 142 is removed from the notch 136. Frontward movement of the actuating bar 61 also causes the roller 62 to engage the lever 122 and thereafter move it about the axis of the shaft 119 into the posiion indicated in FIGURE 5.

During the pivoting of the lever 122 by the bar 61 and roller 62, the stub shaft 126 and pulley 127 are moved through the opening 109 in the web 35 out of the path of movement of the wheeled device 19. Furthermore, movement of the pin 129 with the plate 122 from its position in FIGURE 2 to its position in FIGURE 5 causes a rightward movement of the block 131 and rod 132 which compresses the spring 133 between the truncated member 124 and the fastening nuts 134. Thus, the counterclockwise, retracting movement (FIGURE 5) of the shaft 119 is opposed by the spring 133. Continued frontward movement of the wheeled device 19 will carry the actuating bar 61 and roller 62 past the plate 122 toward the next retractable pulley mechanism 110. However, the retracted pulley mechanism will remain in its retracted position of FIGURE 5.

The springs 146 and 147 urge the lever 142 against the edge of the plate 123 and, accordingly, into either one of the notches 136 and 137 which may be radially aligned with said lever. When the actuating bar 61 and roller 62 move the stub shaft 126 from the position of FIGURE 2 to the position of FIGURE 5, the notch 137 on the plate 123 moves into radial alignment with the upper end of the lever 142, and the springs 146 and 147 move the lever 142 into the notch 137. Thus, the retractable pulley mechanism 110 is locked in the position of FIGURE 5 so that the spring 133 cannot move the retracted pulley mechanism 110 into the support position after the bar 61 has moved frontwardly beyond a point of engagement with the lever 141. It will be noted that the bar 61 will become disengaged from the lever 141 before the roller 62 moves frontwardly from its broken line, final position of engagement with the lever 122 shown in FIGURE 5.

Rearward movement of the vehicle 13 will apply a tension to the reach 92 (FIGURE 1) of the cable 73 and thereby cause the reaches 92 and 97 to move rearwardly and the reach 94 to move frontwardly. This will cause a rearward or leftward movement of the wheeled device 19 at half the speed of the vehicle 13, in this embodiment. However, other speed ratios can be achieved by an appropriate modification of the pulley system engaging the cable 73.

As the wheeled device 19 moves rearwardly, the lower reach of the cable 72 is permitted to drape and rest upon the cable support hooks 46. As the wheeled device moves rearwardly, it also becomes necessary to support the sagging upper reach thereof. This is accomplished by returning the retracted pulley mechanisms 110 to their extended positions of FIGURE 2. Specifically, the rear bevel on the lower edge of the bar 61 engages the lever 141 and moves it from the solid line position to the dotted line position illustrated in FIGURE 3, whereby the lever 142 is moved out of the notch 137. The spring 133 (FIGURE 5) will urge the rod 132 to rotate the plate 122, the stub shaft 126 and pulley 127 about the shaft 119 in a clockwise direction into the position of FIGURE 2. However, the lever 142 is not released from the notch 136 until the roller 62 has moved into the broken line position of FIGURE 5. Thus, the movement of the mechanism 110 into the extended position is controlled. The movement of the retracted pulley mechanism 110 into the support position illustrated in FIGURE 2 is about completed as the notch 136 moves into alignment with the lever 142. The springs 146 and 147 will then cause the lever 142 to move into the notch 136, thereby locking the extended pulley mechanism 110 in the support position.

The pulley 127 is moved into a supporting position well prior to the time when the sagging portion of the upper reach the cable 72 can become a problem. The cable guiding mechanism 75 assures that the cable 72 will be supported by the extended pulley mechanism 110.

The further embodiments of the invention illustrated in FIGURES 8 and 9 operate in substantially the same manner as set forth in the foregoing paragraphs, except that the coil spring 151 is used in place of the helical spring 133 to oppose movement of the pulley mechanism 110 from the support position to the retracted position. The operation of the self-propelled device, which may be substituted for the wheeled device 19 of this application, is fully described in said copending application Ser. No. 511,728. The pulley mechanism 110B may be substantially identical to either the pulley mechanism 110 or the pulley mechanism 110A. The support frame 111 (FIGURE 4) may be modified to provide frame 111B for attachment to the track assembly supporting the device 160. However, such adaptation would not alter the operation of the mechanism 110B from the discussed above with respect to the mechanism 110.

The embodiments of the invention in which an exclusive property or privilege is claimed are defined as follows:

1. A mechanism for supporting and maintaining tension on an elongated, flexible element having one portion connected to means movable along a path and movable with respect to another portion of said element, comprising:
   track means extending along said path;
   first support means mounted upon and movable along said track means, said support means being adapted for engagement with said flexible element between said portions thereof;
   actuating means connected to said first support means and adapted to urge said first support means along said track in response to movement of said movable means; and
   second support means mounted near said track means for movement into and out of a position for supporting said element between said one portion thereof and said first support means, said movement of said second support means being in response to movement of said first support means.

2. A mechanism according to claim 1, including lock means for releasably holding said second support means in said position, and cooperating means on said first support means and said second support means for releasing said lock means and for effecting said movement of said second support means out of said position.

3. A mechanism for supporting and maintaining tension on an elongated, flexible element having one portion connected to a device movable along a path and movable with respect to another portion of said element, comprising:
   track means extending along said path;
   movable means mounted upon and movable along said track means;
   guide means mounted upon said movable means and adapted for engagement with said flexible element between said portions thereof;
   tension means connected to said movable means and adapted to urge said movable means along said track in response to movement of said movable device; and
   support means mounted near said track means for movement into and out of a position for supporting said element between said one portion thereof and said guide means, said movement of said support means being in response to movement of said movable means.

4. A mechanism according to claim 3, wherein said guide means is annular and rotatable;
   wherein there are plural element support means spaced along said track means, each support means being in radial alignment with said guide means when said support means is in said supporting position;
   including frame means supporting each support means for movement between said supporting position thereof and a second position out of radial alignment with said guide means; and
   cooperating means on said movable means and said support means for effecting said pivotal movement of said support means between said positions in response to movement of said movable means.

5. A mechanism according to claim 4, including lock means for holding said support means in said first and second positions.

6. A mechanism according to claim 5, wherein said lock means comprises a shaft rotatably supported upon said frame means, first lever means secured to said shaft and engageable by said movable means, and second lever means secured to said shaft and releasably engageable with said support means.

7. A mechanism for supporting and maintaining tension on an elongated, flexible element having one portion connected to a device movable along a path and movable with respect to another portion thereof, comprising:
   track means extending along said path;
   wheeled means mounted upon and movable along said track means;
   rotary means mounted upon said wheeled means for rotation with respect thereto around an axis transverse of said track means, said rotary means being in engagement with said element between said portions thereof, the part of said element between said rotary means and said one portion extending along said path;
   tension means connected to said wheeled means and adapted to urge said wheeled means along said track means in response to movement of said movable means;
   plural support means supported near and in spaced relation along said track means, each support means being movable between first and second positions, said first position being in radial alignment with said rotary means and in the path of said wheeled means, and said second position being out of radial alignment with said rotary means and out of the path of said wheeled means, each support means being engageable by said part of said flexible element when said support means is in said first position; and
   cooperating means connected to said wheeled means and said support means for effecting movement of said support means from said first position into said second position.

8. A mechanism according to claim 7, including frame means connected to said track means and pivotally supporting said support means for movement around an axis transverse of said track;
   wherein said cooperating means includes a projection on said support means extending into said path of said wheeled means and a roller on said wheeled means engageable with said projection; and
including resilient means yieldably urging said projection into said path of said wheeled means.

9. A mechanism according to claim 7, wherein frame means is secured to said track means and said support means is rotatably mounted thereon;
wherein said support means includes a pulley rotatable about a horizontal axis; and
wherein resilient means yieldably urges said support means so that said pulley is thereby urged into radial alignment with said rotary means.

10. A mechanism according to claim 7, wherein said tension means includes a second elongated, flexible element having the ends thereof respectively connected to said one portion and to said other portion of the first-mentioned elongated element, and pulley means on said track near the opposite ends thereof engageable with said second element, said rotary means being in snug engagement with said second element between said ends thereof.

11. A mechanism according to claim 7, wherein said tension means includes actuating means connected to said rotary means for effecting rotation thereof as said movable means is moved along said track means, and torque means connected between said movable means and said rotary means yieldably opposing rotation of said rotary means in one rotational direction and urging rotation of said rotary means in the other rotational direction, the sense of such urging being such that said movable means is urged along said track means away from said movable means.

12. A mechanism according to claim 7, including frame means connected to said track means and pivotally supporting said support means for movement around an axis transverse of said track;
lever means pivotally supported upon said frame means;
means defining plural notches in said support means;
means urging said lever means into one of said notches when said support means is in one of said positions;
an actuator on said wheeled means for pivoting said lever means out of said notches and, thereafter, effecting movement of said support means between said positions.

13. In a mechanism for supporting and maintaining tension on an elongated, flexible element having one portion connected to means movable along a path and movable with respect to another portion thereof, said mechanism having track means extending along said path, support means mounted upon and movable along said track means, said support means being adapted to engage said element between said portions thereof, and actuating means adapted to urge said support means along said track means in response to movement of said movable means, the combination comprising:
frame means connected to said track means;
pulley means pivotally mounted upon said frame means near said track means for movement between a first position in the path of said support means and a second position out of the path of said support means, said pulley means being engageable by said flexible element between said one portion thereof and said support means when said pulley means is in said first position; and
cooperating means connected to said support means and said pulley means for effecting movement of said pulley means from said first position into said second position.

14. A mechanism according to claim 13, including interengageable lock means on said frame means and said pulley means for releasably holding said pulley means in said position, release of said holding being responsive to movement of said support means along said track means; and
including resilient means yieldably urging said pulley means into said first position.

References Cited

UNITED STATES PATENTS

| | | | |
|---|---|---|---|
| 2,205,665 | 6/1940 | Peters | 191—12 |
| 3,248,487 | 4/1966 | Dechantsreiter | 191—12 |

FOREIGN PATENTS

| | | |
|---|---|---|
| 874,209 | 4/1953 | Germany. |

EVON C. BLUNK, *Primary Examiner.*

H. C. HORNSBY, *Assistant Examiner.*

U.S. Cl. X.R.

212—21